March 8, 1960 G. H. BUTLER ET AL 2,927,622
METHOD AND MEANS FOR DEPOSITING A FILM OF FLUID
BETWEEN A CYLINDRICAL MEMBER AND
SLEEVE ON SAID MEMBER
Filed March 24, 1958
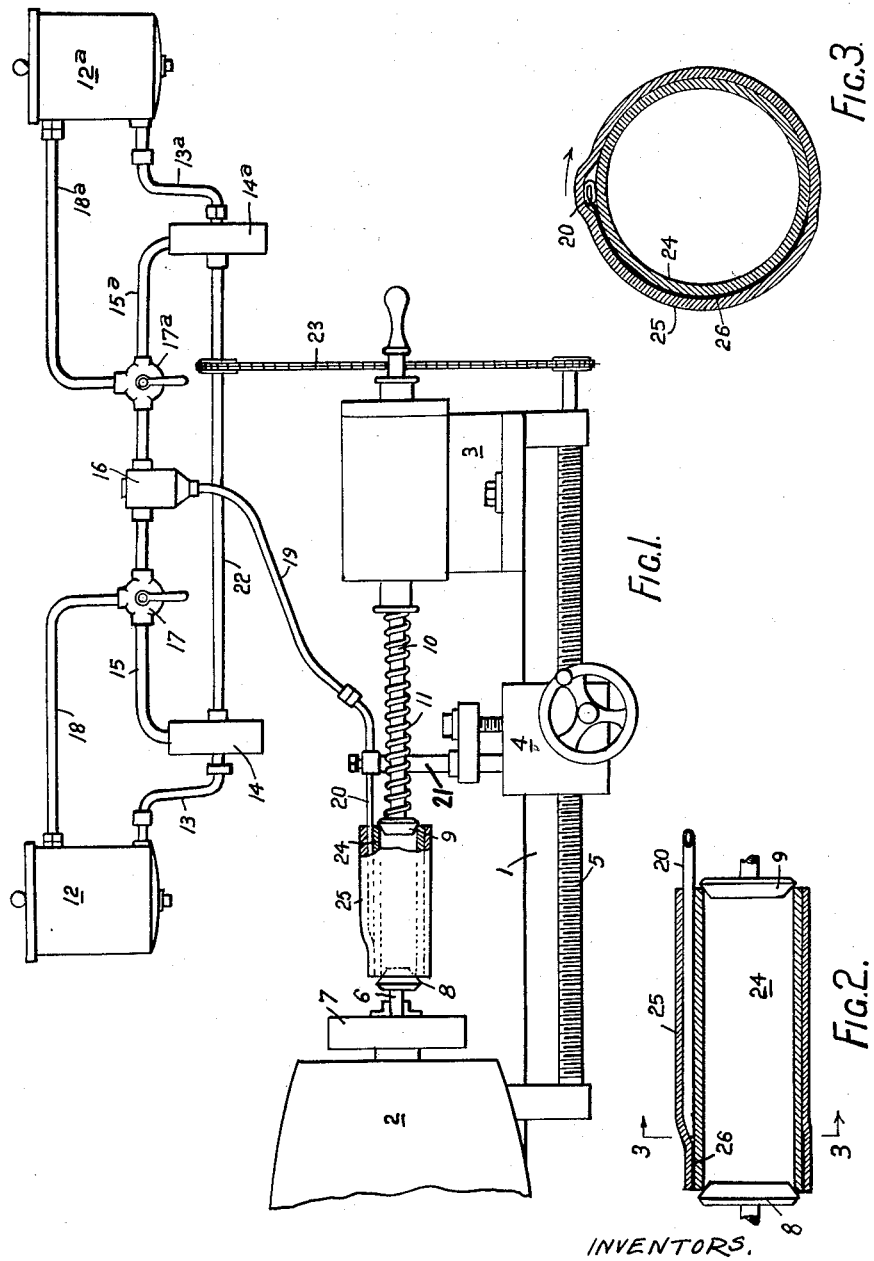
INVENTORS.
G. H. BUTLER
J. B. MACKANESS
By [signature] Atty.

United States Patent Office 2,927,622
Patented Mar. 8, 1960

2,927,622

METHOD AND MEANS FOR DEPOSITING A FILM OF FLUID BETWEEN A CYLINDRICAL MEMBER AND SLEEVE ON SAID MEMBER

Geoffrey Howard Butler, Vaucluse, near Sydney, New South Wales, and James Bellamy Mackaness, Huntleys Point, near Sydney, New South Wales, Australia, assignors to Rota Cota Pty. Limited, Gladesville, near Sydney, New South Wales, Australia, a company of New South Wales, Australia Application March 24, 1958, Serial No. 723,477

Claims priority, application Australia March 27, 1957

8 Claims. (Cl. 154—1)

This invention has been devised to provide a method and means for depositing a film of fluid, for example a bonding agent, between a cylindrical member and a sleeve on said member and in close contact therewith. The invention overcomes a difficulty experienced hitherto in bonding a sleeve of plastic such as, for example, foam plastic to a base tube of some other material. If the sleeve was drawn onto an adhesive coated tube the sleeve substantially cleaned the adhesive from the tube. Expanding the sleeve has been practised in an endeavour to overcome this difficulty but this has not proved satisfactory.

According to this invention the film of fluid is placed between the sleeve and the cylindrical member after the sleeve has been mounted on the cylindrical member. This is accomplished by inserting a feed pipe between the sleeve and the cylindrical member. The film forming fluid is forced through the feed pipe and during the period of discharge, the cylindrical member with the sleeve thereon is rotated or oscillated and the feed pipe is gradually withdrawn. The rate of withdrawal of the feed pipe and the rotation or oscillation of the cylindrical member and sleeve are synchronised so that a complete film of fluid is deposited.

Where it is desired to mix the ingredients or some of the ingredients of the film forming fluid immediately prior to being deposited as aforesaid the ingredients from two or more sources of supply can be forced into and through a mixing vessel on the passage to the feed pipe.

Means for carrying the invention into effect consist of a base with a headstock and a tailstock thereon. There is a saddle slidable on the base and a lead screw to actuate the saddle. A spindle in the headstock has a device such as a chuck to hold the cylindrical member and means to actuate the spindle and the lead screw. A feed pipe mounted on the saddle is positioned to have its discharge end inserted between the cylindrical member and the sleeve. A pump is provided to force film forming fluid through the feed pipe. Where desired means are provided to mix the film forming ingredients immediately prior to depositing the film forming fluid between the cylindrical member and the sleeve.

One embodiment of the means for carrying the invention into effect is described with reference to the annexed drawings wherein.

Fig. 1 is a schematic lay-out of the means.

Fig. 2 is a longitudinal central section of a cylindrical member with a sleeve thereon mounted between a chuck and a support on the tailstock with a feed pipe between the cylindrical member and the sleeve.

Fig. 3 is a section in line 3—3 of Figure 2.

In the embodiment illustrated the base 1 is in the form of a lathe bed with a headstock 2 on one end and a tailstock 3 adjustably secured near the other end. A saddle 4 slidable on the base has conventional means whereby it can be engaged with a lead screw 5 in bearings on the base. The headstock incorporates an actuating motor and the lead screw is connected to the motor by a conventional gear train. An arbor 6 held in a chuck 7 on the headstock spindle has a friction holding poppet head 8. The tailstock also has a poppet head 9 on a spindle 10 which is thrust into holding position by a spring 11.

Two reservoirs 12—12a are provided to hold fluids which when mixed together constitute the film forming fluid; each has an outlet 13—13a to a pump 14—14a. Each pump has a discharge pipe 15—15a to a mixing vessel 16. A control valve 17—17a in each discharge pipe has a by-pass pipe 18—18a returning to the respective reservoirs. A flexible delivery pipe 19 connects the outlet from the mixing vessel 16 to feed pipe 20 which is held on a post 21 on the saddle 4. The feed pipe 20 is of oval section (see Fig. 3). The pumps 14—14a are connected to a common shaft 22 which is driven by sprockets and chain (indicated at 23) from the lead screw 5. The control valves 17—17a are used to apportion the amount of fluid to be delivered from the respective reservoirs 12—12a to the mixing vessel 16.

A conventional stop switch for the headstock motor is located so that it can be actuated by a member on the saddle 4 when the saddle reaches the position where the feed pipe is withdrawn from the cylindrical member 24 and the sleeve 25.

The cylindrical member 24 with a sleeve 25 thereon is supported between the poppet heads 8 and 9. The feed pipe 20 is inserted between the cylindrical member 24 and the sleeve 25 to a position so near the end adjacent the headstock that the film forming fluid—indicated at 26—will penetrate to the end of the sleeve. The complete film fluid is deposited on the operation of the machine as described above.

We claim:

1. Method of depositing a film of fluid between a cylindrical member and a sleeve on said member, said method consisting of inserting a feed pipe between the sleeve and the cylindrical member, forcing the film forming fluid through said feed pipe and during the period of discharge rotating the cylindrical member with the sleeve thereon and withdrawing the feed pipe at a rate which will permit the deposit of a film of fluid on and between the cylindrical member and the sleeve.

2. Method of depositing a film of fluid between a cylindrical member and a sleeve on said member, said method consisting of inserting a feed pipe between the sleeve and the cylindrical member, forcing the film forming fluid through said feed pipe and during the period of discharge oscillating the cylindrical member with the sleeve thereon and withdrawing the feed pipe at a rate which will permit the deposit of a film of fluid on and between the cylindrical member and the sleeve.

3. Method of depositing a film of fluid between a cylindrical member and a sleeve on said member, said method consisting of inserting a feed pipe between the sleeve and the cylindrical member, forcing the ingredients constituting the film forming fluid through a mixing vessel on its passage to said feed pipe forcing the film forming fluid through said feed pipe and during the period of discharge oscillating the cylindrical member with the sleeve thereon and withdrawing the feed pipe at a rate which will permit the deposit of a film of fluid on and between the cylindrical member and the sleeve.

4. Means for depositing a film of fluid between a cylindrical member and a sleeve on said member, said means consisting of a base with a headstock and a tailstock thereon, a saddle slidable on the base, a lead screw to actuate said saddle, a device on a spindle in the headstock to hold the cylindrical member and means to actuate said device and said lead screw, a feed pipe mounted on said saddle positioned to have its discharge end inserted between said cylindrical member and sleeve, and means to force film forming fluid through said feed pipe.

5. Means for depositing a film of fluid between a cylindrical member and a sleeve on said member as claimed in claim 4 including several reservoirs for film forming fluids each having a pump, each pump having a discharge pipe with a control valve thereon, a mixing vessel, said discharge pipes connected to the mixing vessel, a flexible delivery pipe connected to the mixing vessel and to the said feed pipe, and means to actuate said pumps.

6. Means for depositing a film of fluid between a cylindrical member and a sleeve on said member as claimed in claim 5 wherein the pumps are connected to a shaft and the shaft is connected by gearing to the said lead screw.

7. Method of depositing a film of fluid between a cylindrical member and a sleeve on said member, said method consisting of inserting a feed pipe between the sleeve and the cylindrical member, forcing the ingredients constituting the film forming fluid through a mixing vessel, forcing the film forming fluid through said feed pipe and during the period of discharge rotating the cylindrical member with the sleeve thereon and withdrawing the feed pipe at a rate which will permit the deposit of a film of fluid on and between the cylindrical member and the sleeve.

8. Means for depositing a film of fluid between a cylindrical member and a sleeve on said member, said means consisting of a base with a headstock and a tailstock thereon, a saddle slidable on the base, a lead screw to actuate said saddle, a device on a spindle in the headstock to hold the cylindrical member and means to actuate said device and said lead screw, a feed pipe mounted on said saddle positioned to have its discharge end inserted between said cylindrical member and sleeve, and pump means to force film forming fluid through said feed pipe, said pump means connected to a shaft and said shaft connected by gearing to said lead screw.

References Cited in the file of this patent

UNITED STATES PATENTS 2,336,946    Marden et al. _____ Dec. 14, 1943